United States Patent
Caparone

[11] 3,813,033
[45] May 28, 1974

[54] HEATING CONTROL SYSTEM
[75] Inventor: Michael J. Caparone, Arcadia, Calif.
[73] Assignee: Robertshaw Controls Company, Richmond, Va.
[22] Filed: Nov. 2, 1972
[21] Appl. No.: 303,182

[52] U.S. Cl. .............................. 236/9 R, 431/21
[51] Int. Cl. ........................ F23q 9/14, F23n 5/10
[58] Field of Search ............ 236/9 R, 68 D, 21 B; 431/21, 53, 54, 80

[56] References Cited
UNITED STATES PATENTS
| | | | |
|---|---|---|---|
| 3,015,447 | 1/1962 | Carlson | 236/9 X |
| 3,433,411 | 3/1969 | Jackson | 236/21 B |
| 3,652,195 | 3/1972 | McIntosh et al. | 431/21 |

Primary Examiner—W. E. Wayner
Attorney, Agent, or Firm—Anthony A. O'Brien

[57] ABSTRACT

A heating control system including a control device for supplying fuel to burner apparatus and having a pilot safety valve which is closed in response to flame outage at the burner apparatus or a furnace plenum chamber temperature in excess of an abnormal limit temperature, the pilot safety valve not being automatically reopened when the plenum chamber temperature decreases below the abnormal limit temperature to thereby prevent recycling of the heating control system.

7 Claims, 2 Drawing Figures

PATENTED MAY 28 1974 3,813,033

HEATING CONTROL SYSTEM

BACKGROUND OF THE INVENTION

1. Field of the Invention

The present invention pertains to heating systems and, more particularly, to heating systems having high temperature safety controls.

2. Discussion of the Prior Art

Heating control systems conventionally include a space thermostat operating a main valve for controlling a flow of fuel to a main burner. Along with the thermostat, some systems have utilized a recycling limit switch operative in response to furnace plenum chamber temperature to control the main valve such that if the furnace plenum chamber temperature exceeds a predetermined limit temperature the limit switch will inhibit further thermostat control and close the main valve. Once the plenum chamber temperature has decreased below the limit temperature, the thermostat will regain control of the system, and the heating system will recycle.

While the use of recycling limit switches have increased operational safety of heating systems, the recycling operation of the heating systems has the attendant disadvantages of not shutting down the heating system if either the limit switch or the main valve should fail and of permitting hazardous conditions to be reestablished by recycling, thus, presenting the possibility of fire and extensive damage, possibly assisted by unchecked fuel supply. To reduce the danger from failure of the main valve, some systems have used a separate safety valve in series with the main valve, the safety valve being operated by the recycling limit switch; however, these systems, as exemplified by the temperature control system of U. S. Pat. No. 3,523,643, still have the disadvantage of recycling where hazardous conditions exist.

SUMMARY OF THE INVENTION

Accordingly, it is an object of the present invention to overcome the above disadvantages by constructing a heating control system that will not recycle if abnormal plenum chamber temperatures are exceeded in a furnace.

Another object of the present invention is to provide a heating control system that is automatically recycled responsive to a predetermined limit temperature in a furnace plenum chamber and cannot be automatically recycled if the furnace plenum chamber temperature exceeds an abnormal limit temperature greater than the recycling limit temperature.

A further object of the present invention is to protect a heating system by recycling the system at a first limit temperature and shutting down the system at a second limit temperature greater than the first limit temperature.

The present invention has an additional object in the use of a thermocouple current operated electromagnet operator to control a pilot safety valve such that interruption of thermocouple current closes the pilot safety valve but resumption of the thermocouple current cannot reopen or recycle the pilot safety valve.

Some of the advantages of the present invention over the prior art are that heating system safety is substantially increased with a minimum of additional components and that normal high limit recycling operation is combined with non-recycling operation to provide dual high limit temperature control.

The present invention is generally characterized in a control system for use in a heating system for controlling the temperature in a space to be heated including a control device having a main valve and a safety valve controlling fuel flow between an inlet and an outlet supplying fuel to burner apparatus in a furnace, a recycling control including a thermostat for controlling the main valve in accordance with temperature in the space to be heated, and a non-recycling control including an abnormal limit switch actuated when the temperature in the plenum chamber of the furnace exceeds an abnormal limit temperature, the non-recycling control closing the safety valve when the limit switch is actuated and being inoperative to automatically open the safety valve whereby the heating system is shut down and cannot be automatically recycled after the plenum chamber temperature exceeds the abnormal limit temperature.

Other objects of the present invention will become apparent from the following description of the preferred embodiment taken in conjunction with the accompanying drawings.

DESCRIPTION OF THE PREFERRED EMBODIMENT

Figure 1:
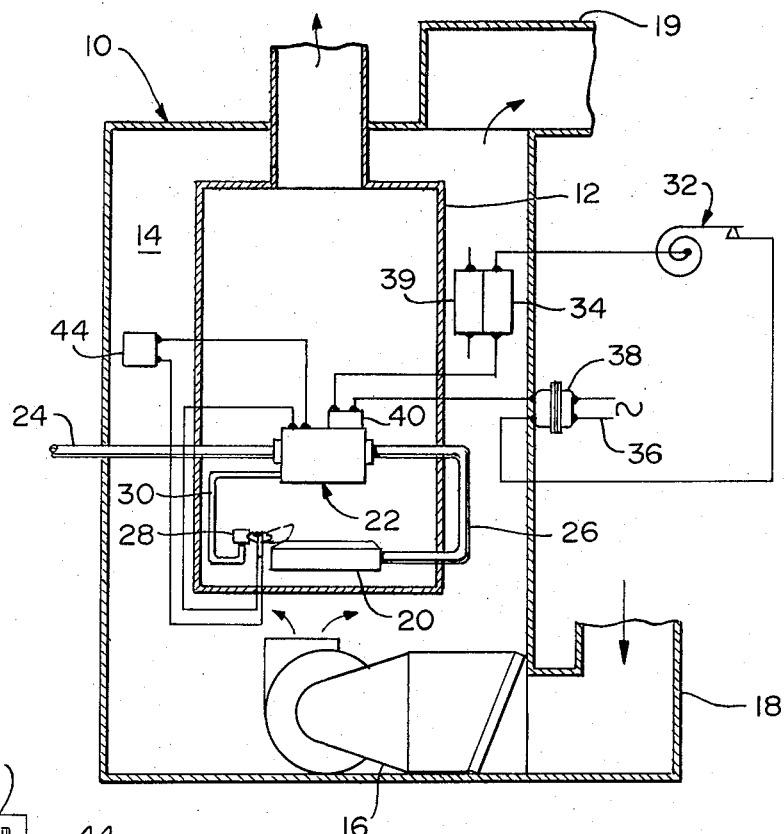
FIG. 1 is a diagrammatic illustration of a heating control system according to the present invention.

A heating control system according to the present invention is illustrated in FIG. 1 for use with a furnace 10 having a heat exchanger 12 therein surrounded by a plenum chamber 14 in which air is heated for supply to a space to be heated. A blower 16 draws air from the space to be heated through a return duct 18 and forces air through the plenum chamber and a supply duct 19 to the space to be heated. A main burner 20 is disposed in the heat exchanger 12 and receives fuel from any suitable supply under the control of a control device 22, fuel being delivered to the control device through a supply conduit 24 and being supplied to main burner 20 through a conduit 26. A pilot burner 28 is disposed in fuel igniting proximity to main burner 20 and receives fuel from control device 22 through a conduit 30.

The control system of the present invention for controlling the operation of the main burner 20 and the pilot burner 28 includes, along with control device 20, a thermostat 32 disposed in the space to be heated and having switch contacts 33 operable to close when the temperature in the space is less than a preset temperature set point and to open when the temperature in the space is greater than the present temperature set point, and a recycling limit switch 34 is disposed in plenum chamber 14 and has switch contacts connected in series with the thermostat 32 and a source of electricity 36, such as available 120v. a.c. supplied through a step down transformer 38. A conventional fan limit switch 39 is also disposed in the plenum chamber to control blower 16 and may be operated by the temperature sensor of limit switch 34. A main valve operator 40 is also connected in series with the thermostat 32 and the limit switch 34 to control fuel flow to main burner 20. A thermocouple 42 is disposed adjacent pilot burner 28 to sense a flame emanating therefrom, one lead from the thermocouple being grounded and the other lead being connected to an energy cutoff abnormal limit switch 44 such that the limit switch 44 is connected in series with the thermocouple 42 and has a safety pilot valve electromagnet operator 46.

Figure 2:
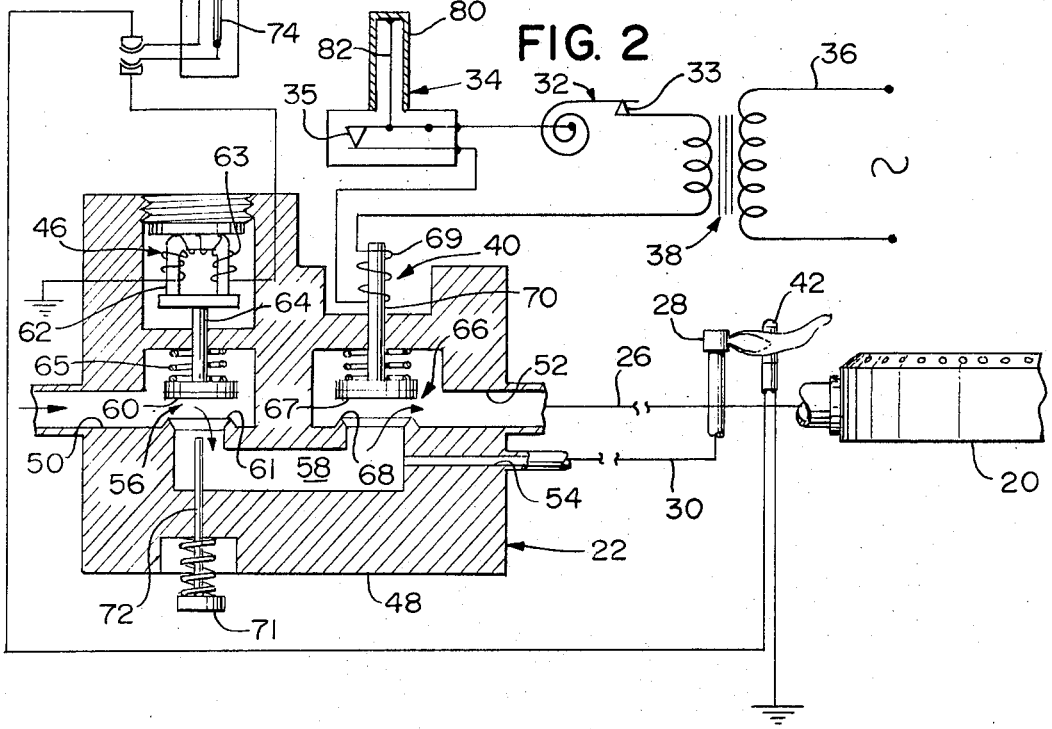
FIG. 2 is a diagrammatic illustration of the control system of FIG. 1.

As illustrated in FIG. 2, control device 22 includes a casing 48 having an inlet 50 receiving fuel from supply conduit 24, a main outlet 52 communicating with conduit 26 for supplying fuel to main burner 20 and a pilot outlet 54 communicating with conduit 30 for supplying fuel to pilot burner 28. A safety pilot valve 56 controls flow from inlet 50 to a chamber 58 within casing 48 and includes a valve member 60 operating with a valve seat 61 and controlled by operator 46 which includes a magnet 62 having a coil 63 wound therearound receiving current generated by thermocouple 42. Valve member 60 is carried by a valve stem 64 which forms an armature for electromagnet operator 46, and a helical spring 65 biases valve member 60 toward valve seat 61. A main valve 66 controls flow between chamber 58 and main outlet 52 and includes a valve member 67 cooperating with a valve seat 68 and controlled by operator 40 which includes a solenoid coil 69 connected in series with limit switch 34 and thermostat 32 and controlling an armature constituted by a valve stem 70 carrying valve member 67. Control device 22, thus, has a main flow passage from inlet 50 to outlet 52 controlled by safety pilot valve 56 and main valve 66 and a pilot flow passage between inlet 50 and outlet 54 controlled only by safety pilot valve 56. A reset button 71 has a stem 72 slidably received in a bore in casing 48 in axial alignment with valve member 60, the stem 72 having a length to move valve member 60 away from valve seat 61 such that the armature carried by the valve stem 64 can be held by operator 46.

Energy cutoff abnormal limit switch 44 includes a bimetal member 74 arranged to deflect away from a contact 76 when temperature in the plenum chamber 14 reaches an abnormal limit temperature and recycling limit switch 34 includes a housing 80 which expands relative to a member 82 with increasing temperature to open the pair of contacts 35 when the temperature in the plenum chamber 14 reaches a recycling limit temperature. While the components in the safety pilot circuit are advantageous due to the inability of the electromagnet operator 46 to open the safety pilot valve by thermocouple current alone, it will be appreciated that other electro-mechanical, fluidic or electronic components can be used in the safety pilot circuit as long as the safety pilot valve 56 cannot be automatically reopened after actuation of the limit switch 44 in response to abnormal limit temperature in the plenum chamber to permit recycling operation. That is, regardless of the components used to implement the present invention, it is important that the pilot valve 56 not be automatically recycled open once an abnormal limit temperature is sensed in the plenum chamber by limit switch 44. The components in the main circuit can similarly have any other desired electro-mechanical, fluidic or electronic construction.

In operation, pilot burner 28 is initially ignited by opening safety pilot valve 56 by depressing reset button 71 to permit fuel flow from supply conduit 24 through valve seat 61 chamber 58, pilot outlet 54 and conduit 30 to pilot burner 28 where the fuel is lit. Thermocouple 42 senses the flame at pilot burner 28 and generates a current to energize electromagnet operator 46 to hold armature 64 and maintain safety pilot valve 56 open. The temperature in the space to be heated is sensed by thermostat 32; and, if the space temperature is above the set point of thermostat 32, the contacts 33 of the thermostat will be open to interrupt the main circuit and deenergize operator 40 to permit a spring to close the main valve 64. If the space temperature drops below the set point, the contacts 33 of thermostat 32 will close to complete the main circuit and energize the coil 69 of solenoid operator 40 to pull in the armature 70 carrying valve member 67 to open the main valve 66 and permit fuel flow from chamber 58 through valve seat 68, main outlet 52 and conduit 26 to main burner 20 where the fuel is lit by the flame from pilot burner 28 to operate the furnace and send warm air through supply duct 19 to the space to be heated. Thermostat 32, thus, provides continuous on-off control for the main burner to maintain the space temperature at the set point.

If the temperature in the plenum chamber 14 of the furnace reaches a predetermined recycling limit temperature, contacts 35 limit switch 34 will open to interrupt the main circuit and close main valve 66, and the main valve cannot be opened again until the plenum chamber temperature, as sensed by limit switch 34, decreases below the predetermined limit to close contacts 35 and permit control of the main circuit to be retained by thermostat 32. Limit switch 34 provides a recycling operation in that once the plenum chamber temperature drops below the predetermined recycling limit temperature the control system can open the main valve 66 for further thermostatic operation of the furnace.

When the temperature in the plenum chamber 14 reaches an abnormal limit temperature, however, energy cutoff limit switch 44 will be actuated to open the safety pilot circuit by deflection of bimetal member 74 away from contact 76; and, when the safety pilot circuit is opened, the holding current generated by thermocouple 42 is not supplied to operator 46 thereby causing pilot valve 56 to close under the force from spring 65 forcing valve member 60 to seal against the valve seat 61. Closure of safety pilot valve 56 stops the flow of fuel through both of the main and pilot flow passages to the main and pilot burners to shut down the heating system. Once the safety pilot valve is closed, the heating system cannot be automatically recycled since operator 46 cannot open the safety pilot valve by itself; and, thus, while there will normally be no current from thermocouple 42 since fuel flow to the burners has been stopped, even if thermocouple 42 should sense a flame, the current generated is not sufficient to permit operator 46 to open safety pilot valve 56. Accordingly, energy cutoff abnormal limit switch 44 provides a secondary limit for the heating system in case the recycling limit switch or the main valve should fail to function properly and prevents possible structural fires which could result from excessive plenum chamber and duct temperatures. That is limit switch 44 is actuated at the abnormal limit temperature which is greater than the recycling limit temperature at which recycling limit switch 34 is actuated to provide dual high limit temperature control.

Inasmuch as the present invention is subject to many variations, modifications and changes in detail, it is intended that all matter described above or shown in the accompanying drawings be interpreted as illustrative and not in a limiting sense.

What is claimed is:

1. A control system for use in a heating system for controlling the temperature in a space to be heated including a furnace having a plenum chamber and burner apparatus disposed in the furnace, said control system comprising a control device having inlet means adapted to receive fuel from a source, outlet means for supplying fuel to the burner apparatus, main valve means for controlling fuel flow between said inlet means and said outlet means, and safety valve means for controlling fuel flow between said inlet means and said outlet means;

recycling control means including a thermostat adapted to be disposed in the space to be heated for thermostatically cycling said main valve means open and closed in accordance with the temperature in the space to be heated, a recycling limit switch adapted to be disposed in the plenum chamber and actuated in response to a recycle limit temperature in the plenum chamber, and a main operator for controlling said main valve means in response to said thermostat and said recycling limit switch to close said main valve means when the space temperature is above a set point for said thermostat or when the plenum chamber is above said recycle limit temperature and to open said main valve means when the space temperature is below the set point of said thermostat if the plenum chamber temperature is below said recycle limit temperature; and non-recycling control means including an abnormal limit switch adapted to be disposed in the plenum chamber and actuated when the temperature in the plenum chamber exceeds an abnormal limit temperature greater than said recycle limit temperature, said non-recycling control means closing said safety valve means when said abnormal limit switch is actuated and being inoperative to automatically open said safety valve means whereby the heating system is shut down and cannot be automatically recycled after the temperature in the plenum chamber exceeds said abnormal limit temperature.

2. The control system as recited in claim 1 wherein said non-recycling control means includes flame sensing means disposed adjacent the burner apparatus and a safety operator for controlling said safety valve means in response to said abnormal limit switch and said flame sensing means to close said safety valve means when either no flame is detected by said flame sensing means or the temperature in the plenum chamber exceeds said abnormal limit temperature.

3. The control system as recited in claim 2 wherein said control device includes reset means for manually opening said safety valve means and said abnormal limit switch includes contact means movable to a closed state below said abnormal limit temperature and to an open state above said abnormal limit temperature.

4. The control system as recited in claim 3 wherein said non-recycling control means includes a thermocouple for sensing a flame at the burner apparatus and an electromagnet operator having a coil connected in circuit with said thermocouple and said abnormal limit switch contact means, said electromagnet operator holding said safety valve means open when current from said thermocouple is supplied to said coil but being inoperative to open said safety valve means.

5. A heating system comprising furnace means for heating air in a plenum chamber and supplying the heated air to a space to be heated including burner apparatus having a main burner and a pilot burner;

a control device having inlet means adapted to receive fuel from a source, main outlet means for supplying fuel to said main burner, pilot outlet means for supplying fuel to said pilot burner, main valve means, safety pilot valve means, reset means for manually opening said pilot safety valve means, a main flow passage from said inlet means to said main outlet means through said main valve means and said safety pilot valve means in series, and a pilot flow passage from said inlet means to said pilot outlet means through said safety pilot valve means;

main circuit means including a thermostat disposed to sense the temperature in the space to be heated, a recycling limit switch disposed to sense the temperature in said furnace plenum chamber and a main operator controlling said main valve means, said thermostat and said recycling limit switch being connected in circuit with said main operator to open said main valve means when the temperature in said furnace plenum chamber is below a recycling limit temperature and the temperature in the space to be heated is below a set point for said thermostat and to close said main valve means when either the temperature in said furnace plenum chamber exceeds said recycling limit temperature or the temperature in the space to be heated exceeds said thermostat set point; and non-recycling pilot circuit means including flame sensing means for sensing a flame at said pilot burner, an abnormal limit switch disposed to sense the temperature in said furnace plenum chamber and a pilot operator controlling said pilot safety valve means, said abnormal limit switch including a pair of contacts movable to an open state when the temperature in said furnace plenum chamber is above an abnormal limit temperature greater than said recycling limit temperature and to a closed state when the temperature in said furnace plenum chamber is less than said abnormal limit temperature, said flame sensing means and said pair of contacts of said abnormal limit switch being connected in circuit with said pilot operator to hold said safety pilot valve means open when a flame is sensed at said pilot burner and the temperature in said furnace plenum chamber is below said abnormal limit temperature, to close said safety pilot valve means when either a flame is not sensed at said pilot burner or the temperature in said furnace plenum chamber exceeds said abnormal limit temperature, and to prevent said safety pilot valve means from opening after closure in response to the temperature in said furnace plenum chamber exceeding said abnormal limit temperature even if the temperature in said furnace plenum chamber decreases below said abnormal limit temperature whereby said heating system cannot automatically recycle after said abnormal limit temperature has been exceeded in said furnace plenum chamber.

6. The heating system as recited in claim 5 wherein said flame sensing means includes a thermocouple and said pilot operator includes a magnet having a coil wound therearound and receiving current from said thermocouple.

7. The heating system as recited in claim 5 wherein said main operator includes a coil opening said main valve means when energized and closing said main valve means when not energized, and said recycling limit switch includes a pair of contacts connected in series with said thermostat and said main operator coil, said contacts being opened when the temperature in said furnace plenum chamber exceeds said recycling limit temperature to deenergize said main operator coil and being closed when the temperature in said furnace plenum chamber is less than said recycling limit temperature to energize said main operator coil if the temperature in the space to be heated is less than said thermostat set point.

* * * * *